Patented Nov. 10, 1925.

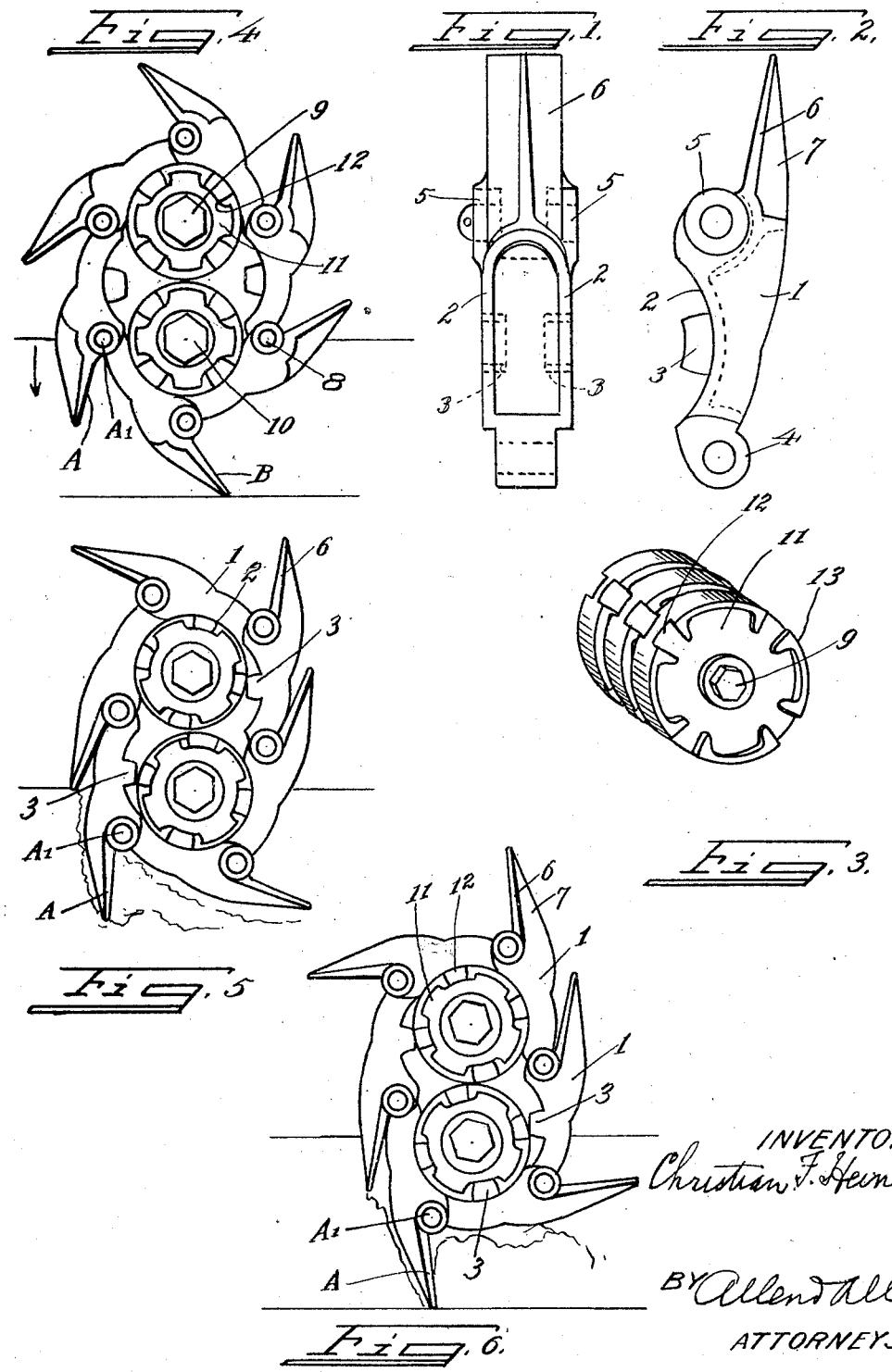

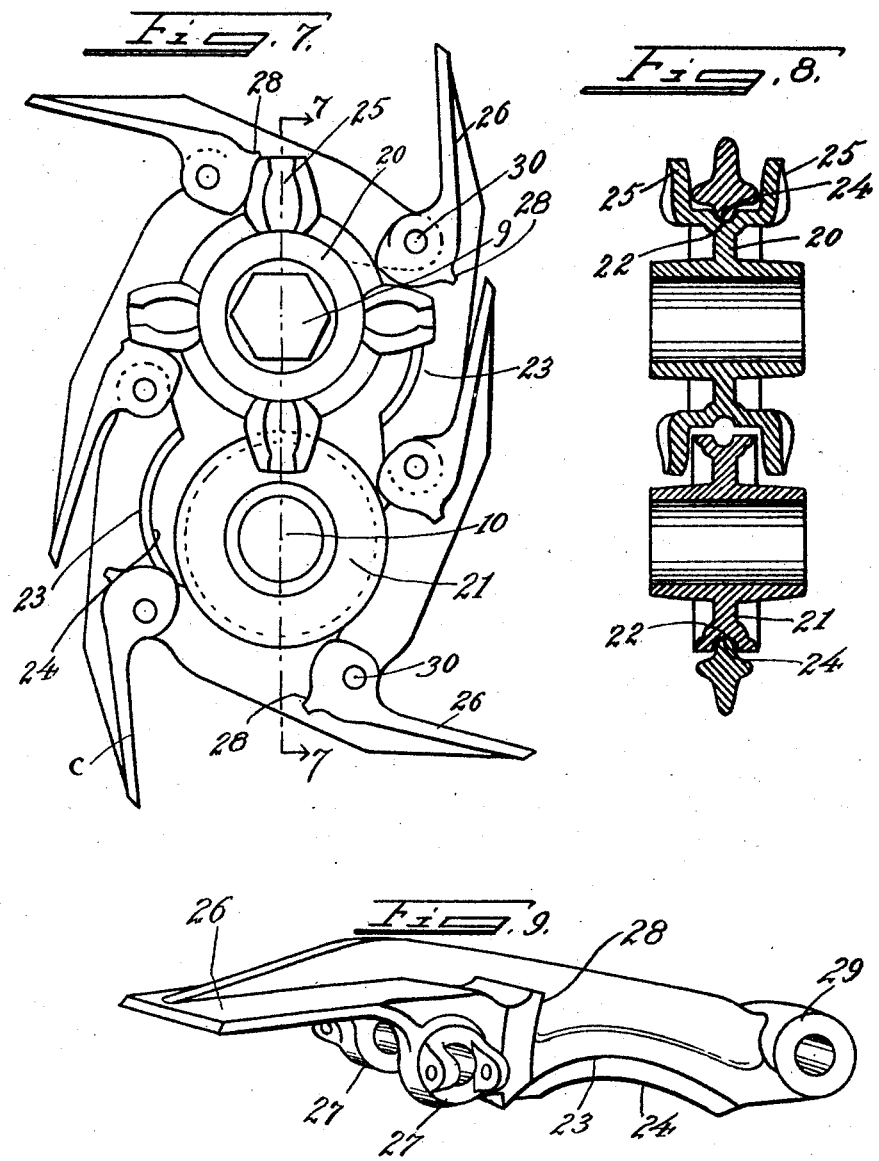

1,560,573

UNITED STATES PATENT OFFICE.

CHRISTIAN F. HEINSS, SR., OF FORT MADISON, IOWA.

EARTH-SPADING DEVICE.

Application filed January 9, 1925. Serial No. 1,469.

*To all whom it may concern:*

Be it known that I, CHRISTIAN F. HEINSS, Sr., a citizen of the United States, and a resident of Fort Madison, in the county of Lee and State of Iowa, have invented certain new and useful Improvements in Earth-Spading Devices, of which the following is a full, clear, and exact description, reference being had to the accompanying drawings, forming part of this specification.

My invention relates to devices used in spading up the soil, by power means, as applied to machines of the type set forth in my Letters Patent of the United States No. 1,170,635, dated February 8, 1916.

In the patent referred to I show a tractor having a driving shaft and sprocket chains to impart rotary motion to a rear drum, there being also an idle drum below it. The drums carry large chains formed of links which have spades formed thereon and the drums revolve more rapidly than the machine progresses over the ground to the end that the spades have a very special kind of action.

As explained in that patent and in my United States Patent No. 1,302,657, the spades enter the earth on a vertical line, moving down as a hand operated spade would work; they tip when down in the earth, and then are raised and further tipped, to the end that the earth is lifted up and scattered.

In my Patent No. 1,302,657, above referred to I make a special point of triangular drums, by means of which the spades are given a very prominent action of the character noted together with a violent agitation, that shakes the earth away from them, as they rise.

The object of my present invention is to modify the triangular structure, so as to obtain to a large degree, although not completely, the action of the triangular drum and spading chain, of my patent referred to and to thus provide a smoother action, preferably in soils which do not have great amounts of old stubble, clover, sod, or rubbish on them at the time of cultivation.

It is also my object to provide a smoother action to the end of cutting down somewhat the power requirements, and wear on the parts, with the least sacrifice in efficiency.

I accomplish my said objects by that certain construction and arrangement of parts to be hereinafter more specifically pointed out and claimed.

In the drawings:

Figure 1 is a front elevation showing the spading device in the form of a chain link.

Figure 2 is a side elevation of the same device.

Figure 3 is a perspective of form of sprocket drum used with the said spading devices.

Figure 4 shows the assembly, with a selected spade starting down.

Figure 5 shows the same parts with the selected spade further down in the ground.

Figure 6 shows the end of the spading action with the selected spade clear down in the ground, and ready to start up in the ejecting action.

Figure 7 is a side elevation of a modified structure.

Figure 8 is a section on the line 7—7 of Figure 7.

Figure 9 is a perspective of a modified form of spade link.

In one form the links used in the spading chains are formed with bodies 1, having curved inner faces 2, and a pair of curved faced, interspaced lugs 3, 3, extending from the side edges of the said curved inner faces.

The bodies are formed with sleeves 4, at one end, which may be termed the rear end, and with interspaced sleeves or eyes, 5, 5, at what may be termed the forward end.

At this forward end the metal of the bodies is brought forward in the shape of a pointed spade 6, having a central back bracing web 7.

In forming a chain of these links, the interspaced sleeve portions of the links are set over the single sleeve portion of the adjacent links, and swivel pins 8 are set through the aligned holes in the sleeves.

I will use on the drum of my machine, for which see my patents heretofore referred to, as many of the chains made up of these links, as are found desirable.

In the use with the forms of links shown, I preferably mount on suitable cross shafts, rotatably supported, a series of collars or hubs, which together with the shafts, make up the sprocket drums.

Thus I have indicated the upper shaft 9 and the lower shaft 10. On these shafts are set collars or hubs formed with solid bodies 11, and laterally extended rims 12. These rims are cut at each side with correspondingly placed recesses 13, 13, said recesses being spaced so as to receive the interspaced lugs on the chain links, and hence forming sprockets for the chains.

It will be noted that the drums so formed are generally round, and that the inner faces of the links which abut against them are round also, to fit said drums.

It will be noted that there are four sets of recesses to engage the lugs on the chain links, this being preferred as giving the most decided action to the spades, as will now be described.

For the general operation of the machine I refer to my two patents above noted. For the specific operation herein, Figures 4, 5 and 6, are included in the drawings.

Starting with Figure 4, it will be noted that the two drums are one above the other in a vertical line. When the spade selected as A, comes down in the direction of the arrow, it is in about a vertical line, and is held so by the chain below it, and by the position of its pivot $A^1$ to the link which it is following. After a slight additional movement, the link is not yet engaged, by means of its lug with the lower drum, and thus still lies in a vertical line (Figure 5) with its spade pushed further down into the soil. By the time the spade is clear down to the depth possible, its link lugs will just have come into engagement with the recesses in the drum, and a vertical position of the spade will still be maintained.

This last position is shown in Figure 6, and by reference back to Figure 4, to the spade B, the next position of spade A will be shown. Thus, after reaching its greatest depth, the spade will begin to move in an arc, following around on the drum, and will thus lift up the earth, it has displaced, and when it has been completely passed around the drum, and its lugs again freed, it will have flung the earth away from the drum behind the machine.

As explained in my patents the action is like the buckets on the wheel of a rear paddle wheel steam boat, so far as flinging the earth away is concerned, and by preserving the proper relation in size of drum and sprocket, I gain the direct insertion of the spades, as in my former patents.

In one form of my invention I omit the widened rim of the collars on the lower drum altogether, leaving merely the central disc-like portion, which the lugs on the chain links will straddle. This I find operates satisfactorily.

The effect in the triangular drum with flat faced links, as compared to the round drum with the curved faced links, is to give the effect of the links slapping the faces of the drum when they come into line therein, and a jerking action is advantageous in clearing the spades, and to this extent my present invention is not as efficient in cluttered up and soggy ground, as my former devices.

As will be noted, however, the result in action, of the spades, in digging vertically, and then tipping and flinging the earth dug out, is practically the same, without the same leverage or jerky action.

I find that by having the lugs of two links in engagement with recesses in the upper drum, at all times, that the seating of the lugs in the recesses is smoother than in my former structures, with less likelihood of slippage.

In the modified form shown in Figures 7 to 9, the principle of operation is the same, but an improvement has been made in the nature of relative operation of drums and chains, to the end that the drums have an inter-engagement with each other as well as being held by the chains. The result of this is that the accumulation of dirt, sod, and the like, on the drums or sprockets is prevented, and any tendency to accumulation is avoided by each sprocket scraping the surfaces of the other one of its pair.

Also the links forming the spading chains are formed without any projections, except two shoulders extending outwardly, so that accumulation of dirt on the bearing surfaces of the links is avoided, which avoids increasing of the operating radius of the links. This increase of operating radius, which would result from accumulation of dirt between the lugs 3 of the first form described stretches the chains so tightly to the sprockets that breakage has occurred. This I avoid by my modified construction, while the same general action is preserved.

Describing the modified structure, which is my preferred structure more fully, the sprockets 20 are mounted on the shaft 9, and the idlers 21 mounted on the shaft 10 of the machine. The sprockets and idlers are arranged in pairs one above the other, along the shafts to provide a drum. Also each sprocket and idler has a circular bearing surface in the center of which is formed a channel or peripheral groove 22. The links have the curved bearing faces 23, and a central web 24 which lies in the grooves 22 and preserves the chains in alignment. The difference between the idlers and the sprockets is that on the sprockets, in this instance at four points, I provide laterally and outwardly projecting lugs 25.

The links are formed with spades 26, directed as before, and at the inner end of each spade are located the pair of sleeves 27, behind which shoulders 28, 28, are formed. The small ends of the links have the single sleeves 29, which in making up the chain are set between the sleeves 27 of adjacent links, and the coupling completed by means of pins 30.

In operation the lugs on the sprockets engage the shoulders 28 on the links and thus feed the chains around. The lugs 28 are also formed so as to straddle the lower idlers (Figure 7), resulting in the cleaning action noted, and leaving no space in which dirt can accumulate.

The direction of the spades with relation to the bodies of the links, and relative sizes of spaces and links, and the curved surface engagement between the sprockets and idlers and the links, is the same as in the first instance. By reference to Figure 7, it will be noted that the spade C has not reached its fullest depth, nor has its curved bearing face come into contact with the lower idler. Until this contact takes place, this link will retain the vertical direction of its spade to a large degree, due to the action of the chain above it.

The direction of the travel of the tractor, preferred in my machine, will be to the left, in Figures 4 to 7.

Having thus described my invention, what I claim as new and desire to secure by Letters Patent, is:—

1. In a device of the character described, the combination of a chain formed of links having spading portions extending therefrom, and a sprocket for driving said chain, said sprocket having a series of projections and a curved periphery, and the links having curved faces to engage the sprocket periphery, and laterally projecting lugs to be engaged by the sprocket projection.

2. In a device of the character described, the combination of a chain formed of links having spading portions extending therefrom, and a sprocket for driving said chain, said sprocket having interspaced projections in pairs about its periphery, said periphery and recesses being curved, and the links having curved inner faces to abut the sprocket and laterally projecting lugs to engage the recesses in the sprocket.

3. In a device of the character described, the combination of a pair of interspaced disks, the upper being formed as a sprocket and driven, and the lower having a curved periphery, and a chain passing over said disks, said chain being formed of links having means for engagement with the upper or sprocket disk, and a curved bearing face, and said links having spades thereon, said links being of a length approaching the length of the diameter of the lower disk.

4. In a device of the character described, the combination of a pair of interspaced disks, the upper being formed as a sprocket with a curved periphery, and the lower having a curved periphery and a chain passing around said disks, and adapted to engage the upper one as a sprocket, said chain being formed of links having a curved face to fit the lower disk, and of a length approaching the diameter of the lower disk, said links having spading devices extending therefrom.

5. In a device of the character described, the combination of a pair of interspaced disks the upper being formed as a sprocket, and the lower having a circular periphery and a chain passing around said disks, and adapted to engage the upper one as a sprocket, said chain being formed of links having a curved face to fit the lower disk, and of a length approaching the diameter of the lower disk, whereby the links may move in substantially a straight line from the upper disk to a position with its lower end about at the level of the lower face of the lower disk, said links having spading devices extending therefrom, said sprocket having a member adapted to wipe the edges of the lower disk, for the purpose described.

6. In a device of the character described, the combination of a chain formed of links having spading portions extending therefrom, and a sprocket for driving said chain, said sprocket having interspaced projections in pairs about its periphery, said periphery being curved, and the links having curved inner faces to abut the sprocket and laterally projecting lugs to engage the said recesses, and a lower member around which the links pass, said member having a curved periphery and the sprocket being so located with relation to said lower member that its projections wipe the edge of said member.

CHRISTIAN F. HEINSS, Sr.